(12) United States Patent
Kozaki (10) Patent No.: US 9,562,566 B2
(45) Date of Patent: Feb. 7, 2017

(54) ROLLER BEARING

(71) Applicant: JTEKT CORPORATION, Osaka-shi, Osaka (JP)

(72) Inventor: Hikotsugu Kozaki, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/806,165

(22) Filed: Jul. 22, 2015

(65) Prior Publication Data

US 2016/0032972 A1 Feb. 4, 2016

(30) Foreign Application Priority Data

Aug. 1, 2014 (JP) .................................. 2014-157438

(51) Int. Cl.
*F16C 33/46* (2006.01)
*F16C 33/56* (2006.01)

(52) U.S. Cl.
CPC ....... *F16C 33/4676* (2013.01); *F16C 33/4635* (2013.01); *F16C 33/4682* (2013.01)

(58) Field of Classification Search
CPC .............. F16C 33/4635; F16C 33/4652; F16C 33/4664; F16C 33/4676; F16C 33/6614; F16C 33/6651
USPC ........................................ 384/470, 576, 580
See application file for complete search history.

(56) References Cited

U.S. PATENT DOCUMENTS

| | | | | |
|---|---|---|---|---|
| 4,952,079 A | * | 8/1990 | Lingner | ................ F16C 33/543 384/572 |
| 5,033,878 A | * | 7/1991 | Tsuji | ..................... F16C 23/086 384/576 |
| 8,092,097 B2 | * | 1/2012 | Ohashi | .......................... 384/470 |
| 8,939,865 B2 | * | 1/2015 | Nakagawa | .............. F16C 33/56 384/572 |

FOREIGN PATENT DOCUMENTS

| | | | |
|---|---|---|---|
| JP | H02-19928 U | 2/1990 | |
| JP | H09-79268 A | 3/1997 | |
| JP | 3007267 B2 * | 2/2000 | .......... F16C 33/6681 |
| JP | 2001-304270 A | 10/2001 | |
| JP | 2005-069282 A | 3/2005 | |
| JP | WO 2013042521 A1 * | 3/2013 | .............. F16C 33/56 |

* cited by examiner

*Primary Examiner* — Phillip A Johnson
(74) *Attorney, Agent, or Firm* — Oliff PLC (57) ABSTRACT

A cage includes a pair of annular rings and a plurality of cage bars, and an area enclosed by the pair of annular rings and the circumferentially adjacent cage bars that serves as a pocket that holds the roller. The cage further includes a tab provided so as to protrude from a radially outer area of the cage bars to prevent the roller in the pocket from slipping out through the pocket toward a radially outer side. A surface of a bottom portion of the tab is discontinuous with surfaces of the cage bar, which are located on both sides of the tab in a longitudinal direction.

5 Claims, 12 Drawing Sheets

(LONGITUDINAL DIRECTION)

(LONGITUDINAL DIRECTION)

FIG.12

ROLLER BEARING

INCORPORATION BY REFERENCE

The disclosure of Japanese Patent Application No. 2014-157438 filed on Aug. 1, 2014 including the specification, drawings and abstract, is incorporated herein by reference in its entirety.

BACKGROUND OF THE INVENTION

1. Field of the Invention

The invention relates to a roller bearing.

2. Description of Related Art

Roller bearings are used as bearings that support rotating shafts of various types of equipment. For example, in a hydraulic pump for a construction machine, a roller bearing is used to receive a component of an axial load imposed on a piston and a swash plate.

The roller bearing includes an inner ring, an outer ring, a plurality of rollers, and an annular cage that holds the rollers. The cage includes a pair of annular rings and a plurality of cage bars joining the annular rings together. Areas enclosed by the pair of annular rings and circumferentially adjacent cage bars are configured as pockets that hold respective rollers (see, for example, FIG. 1 in Japanese Patent Application Publication No. 2005-69282 (JP 2005-69282 A)). In recent years, resin has been adopted as a material for the cage in order to meet a demand for reduced costs.

Figure 11:
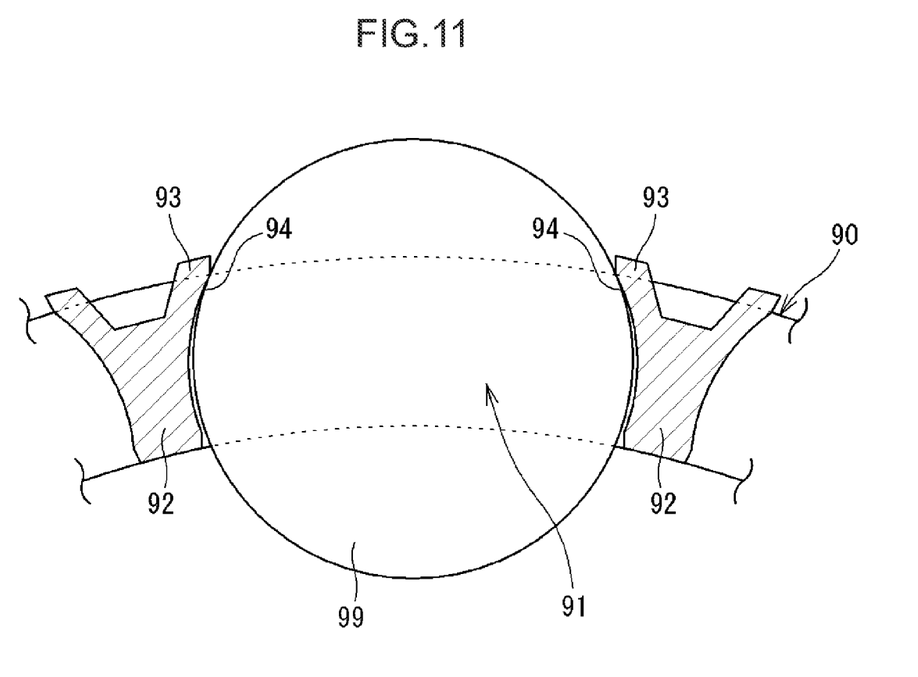
FIG. 11 is a transverse sectional view of the conventional cage.

In some cages, tabs 93 are provided in a radially outer area of a cage bar 92 so as to prevent a roller 99 from slipping out through a pocket 91 as depicted in FIG. 11. The tabs 93 protrude from the cage bar 92. When the bearing is assembled, the roller 99 in the pocket 91 comes into contact with inner surfaces 94 of the tabs 93. Thus, the roller 99 can be prevented from slipping out (falling) through the pocket 91. When assembly of the bearing is complete, the tabs 93 allow the cage 90 to be positioned between the inner ring and the outer ring by the rollers 99.

Figure 12:
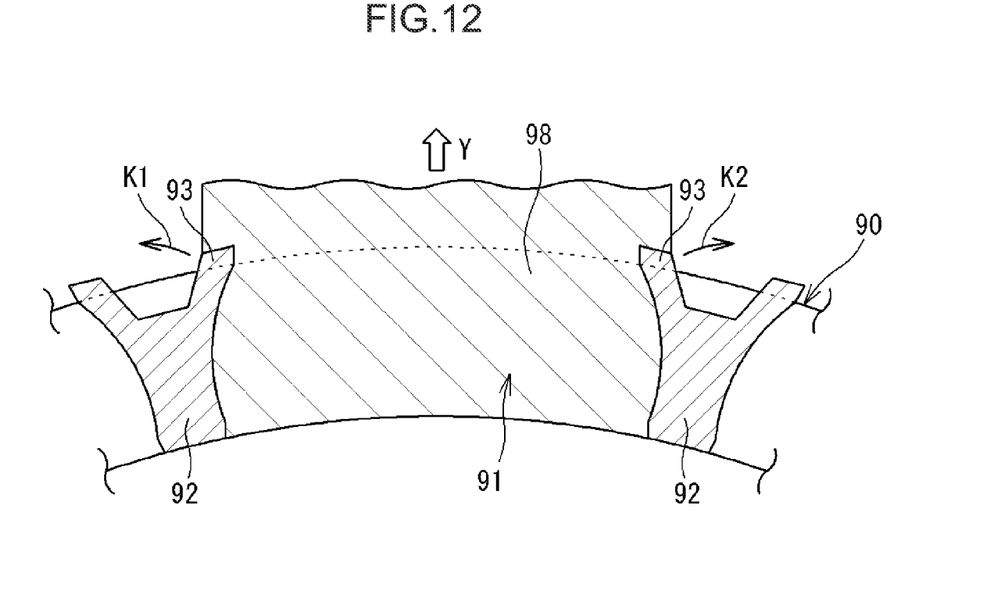
FIG. 12 is a sectional view illustrating a state where the conventional cage is being molded.

To allow the cage 90 as described above to be molded using resin, a molten resin is poured into a cavity in a mold and solidified. To allow the cage 90, which is a molded product, to be demolded, a part 98 of the mold that penetrates the cage 90 in a radial direction needs to be extracted through the molded pocket 91 toward the outside in the radial direction (arrow Y direction in FIG. 12) as depicted in FIG. 12.

At this time, what is called forced extraction needs to be performed in which the part 98 of the mold is extracted while the tabs 93 are being elastically deformed. In FIG. 12, directions in which the tabs 93 are elastically deformed are depicted by arrows K1 and K2. It is expected that, when forced extraction is performed in this manner, heavy loads are imposed on forcibly extracted portions (tabs 93) and peripheries thereof, leading to local stress. The stress may cause the cage 90, formed of the resin, to be subjected to whitening or damage such crack or breakage.

SUMMARY OF THE INVENTION

An object of the present invention is to provide a roller bearing that enables local stress to be suppressed in a cage.

According to an aspect of the present invention, a roller bearing includes: an inner ring; an outer ring; a plurality of rollers provided between the inner ring and the outer ring; and a cage made of resin and holding the rollers at intervals along a circumferential direction. The cage includes a pair of annular rings and a plurality of cage bars that is disposed such that a longitudinal direction of the cage bars is parallel to a center line of the cage and that couples the annular rings together. An area enclosed by the pair of annular rings and the circumferentially adjacent cage bars serves as a pocket that holds the roller. The cage further includes a tab provided so as to protrude from a radially outer area of the cage bar to prevent the roller in the pocket from slipping out through the pocket toward a radially outer side. A surface of a bottom portion of the tab is discontinuous with surfaces of the cage bar, which are located on both sides of the tab in the longitudinal direction.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the present invention will be described below based on the drawings.

Figure 1:
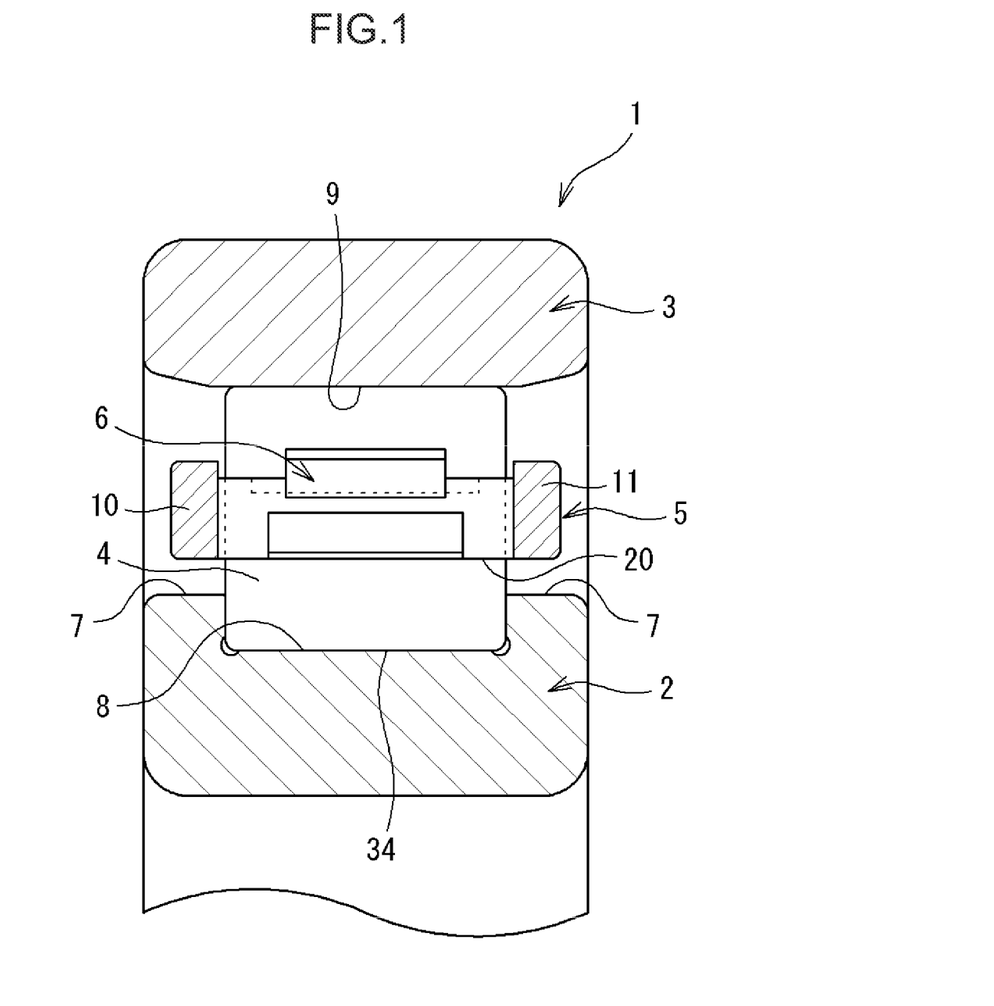
FIG. 1 is a longitudinal sectional view depicting an embodiment of a roller bearing of the present invention.

FIG. 1 is a longitudinal sectional view depicting an embodiment of a roller bearing of the present invention. A roller bearing can be used as a bearing that supports a rotating shaft of various types of equipment. A roller bearing 1 depicted in FIG. 1 is used for a hydraulic pump for a construction machine. The roller bearing 1 can receive a component of an axial load imposed on a piston and a swash plate provided in the hydraulic pump and not depicted in the drawings.

The roller bearing 1 includes an inner ring 2, an outer ring 3, a plurality of rollers 4, and an annular cage 5. The rollers 4 are provided between the inner ring 2 and the outer ring 3. The cage 5 holds the rollers 4 at intervals along a circumferential direction. The rollers 4 are cylindrical rollers each having a cylindrical outer peripheral surface 34. The roller bearing 1 of the present embodiment is a cylindrical roller bearing.

Annular ribs 7 and 7 protruding radially toward are provided on both sides of the inner ring 2 in an axial direction. A raceway surface 8 on which the rollers 4 roll is provided on an outer periphery of the inner ring 2 between the ribs 7 and 7. A part of an inner peripheral surface of the outer ring 3 serves as a raceway surface 9 on which the rollers 4 roll.

Figure 2:
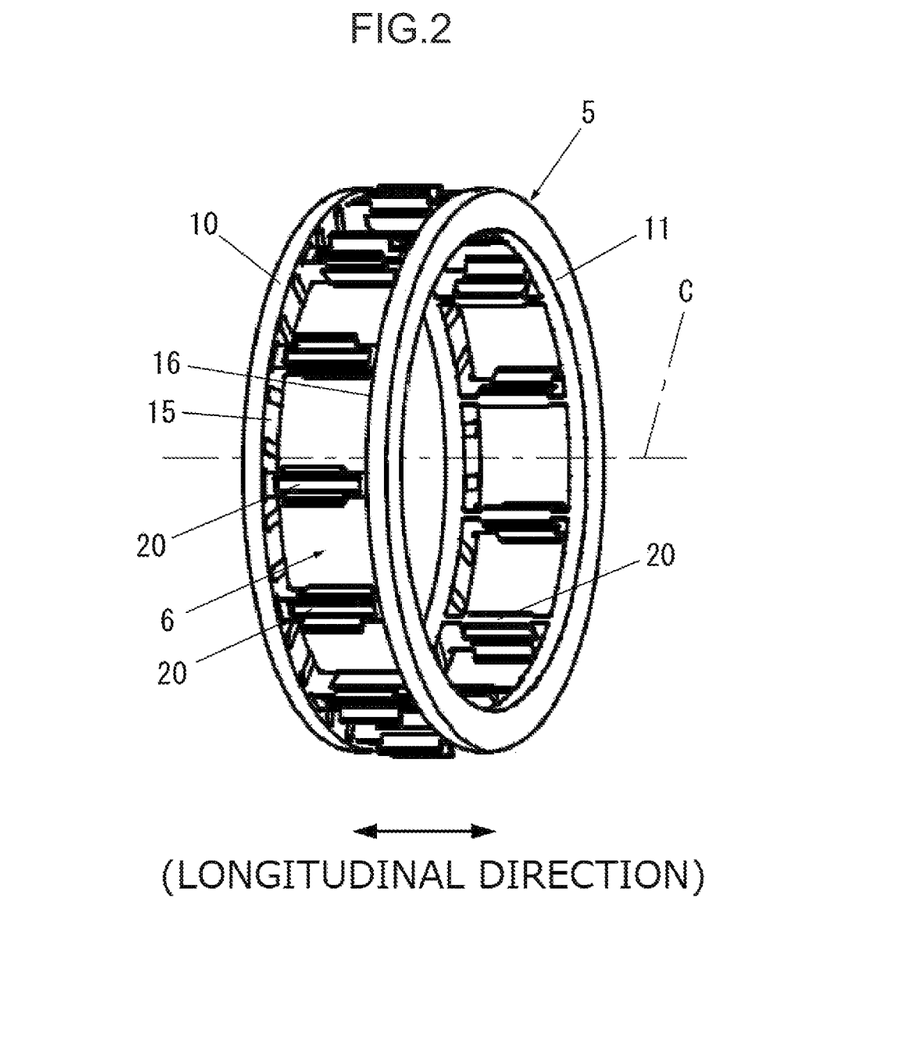
FIG. 2 is a perspective view of a cage.

FIG. 2 is a perspective view of the cage 5. The cage 5 is a window type cage and includes a pair of annular rings 10 and 11 and a plurality of cage bars 20. The cage bars 20 are provided at intervals (regular intervals) in the circumferential direction. Each of the cage bars 20 is disposed such that a longitudinal direction of the cage bar 20 is parallel to a center line C of the cage 5, and couples the annular rings 10 and 11 together.

Each area enclosed by the pair of annular rings 10 and 11 and the circumferentially adjacent cage bars 20 and 20 serves as a pocket 6 that holds the roller 4 (see FIG. 1). In other words, each pocket 6 is a space surrounded by the annular rings 10 and 11 facing in the longitudinal direction and the circumferentially adjacent cage bars 20 and 20.

The cage 5 is formed of resin (synthetic resin) and manufactured by pouring a molten resin in a cavity in a mold and solidifying the resin. Thus, the annular rings 10 and 11 and the cage bars 20 are integrally formed. As described above, the roller bearing 1 of the present embodiment is incorporated in a hydraulic pump. Oil used for the hydraulic pump contains an additive that severely damages resins such as nylon. Consequently, in the present embodiment, a resin material with high chemical resistance is adopted as a material for the cage 5. For example, the material for the cage 5 is polyphenylene sulfide (PPS).

Figure 3:
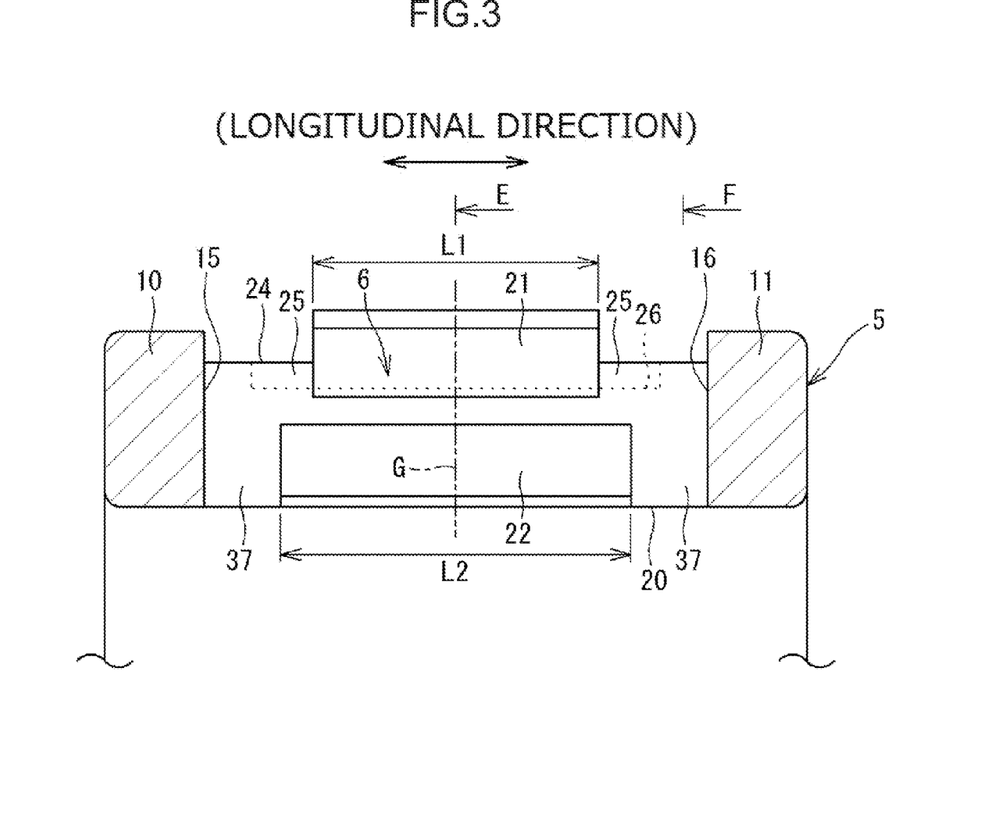
FIG. 3 is a longitudinal sectional view of the cage.
Figure 4:
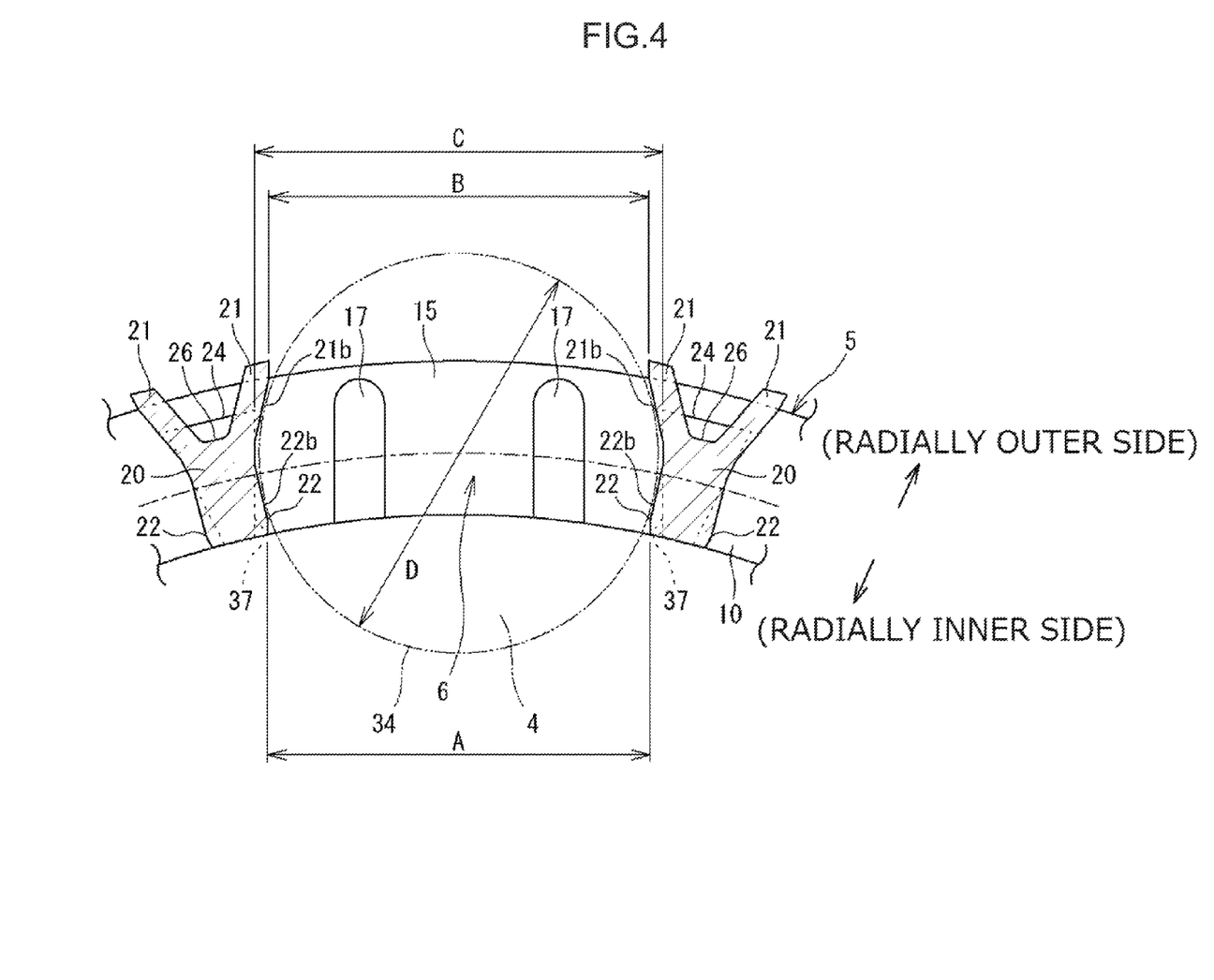
FIG. 4 is a sectional view of the cage depicted in FIG. 3, as viewed in the direction of arrow E in FIG. 3.
Figure 5:
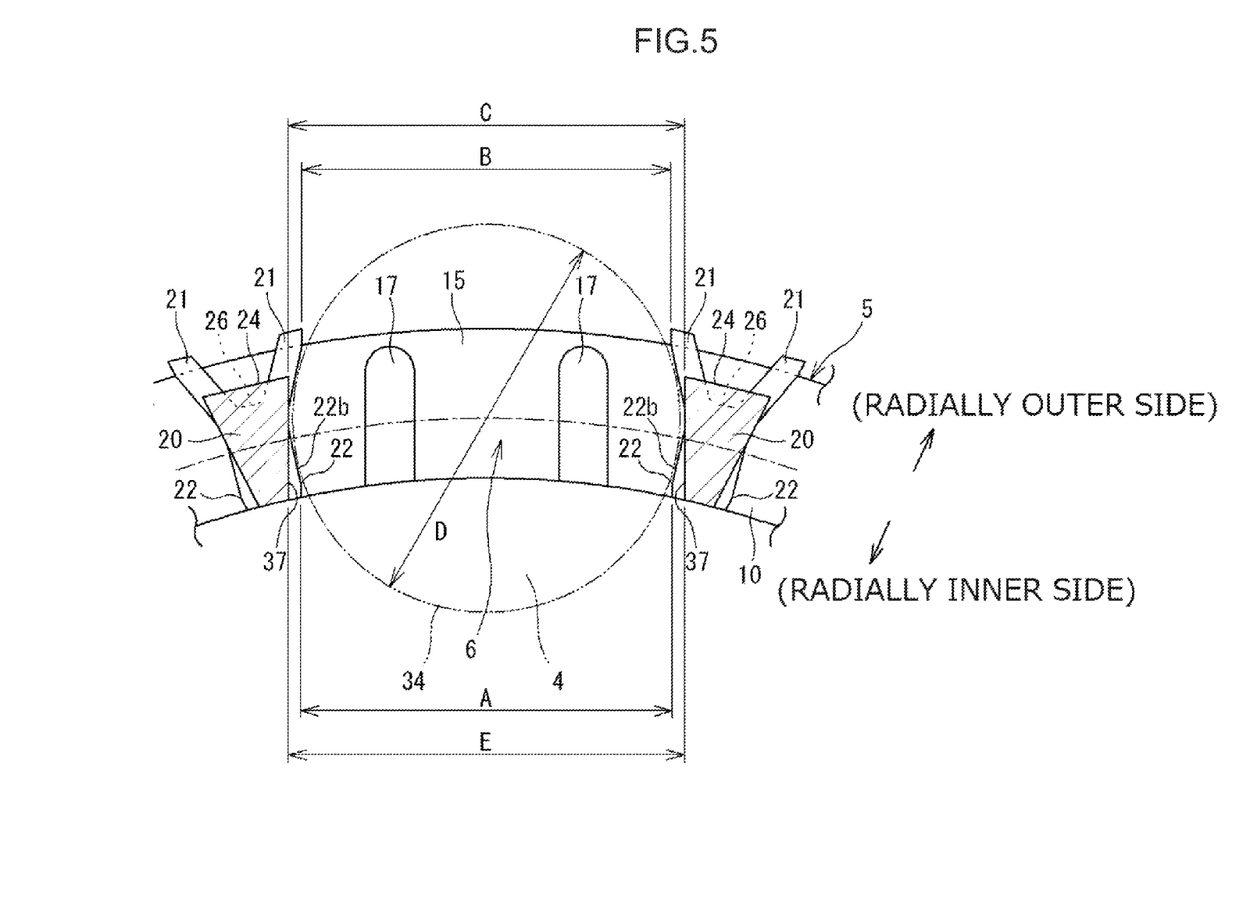
FIG. 5 is a sectional view of the cage depicted in FIG. 3, as viewed in the direction of arrow F in FIG. 3.

FIG. 3 is a longitudinal sectional view of the cage 5. FIG. 4 is a sectional view of the cage 5 depicted in FIG. 3, as viewed in the direction of arrow E in FIG. 3. FIG. 5 is a sectional view of the cage 5 depicted in FIG. 3, as viewed in the direction of arrow F in FIG. 3. In FIG. 4 and FIG. 5, the rollers 4 are depicted by a long dashed double-short dashed line. The cage 5 has tabs 21 in a radially outer area of the cage bar 20. The tabs 21 each face the outer peripheral surface 34 of the roller 4 with a gap therebetween. The tabs 21 are provided on both sides of each cage bar 20 in the circumferential direction.

The tabs 21 are provided so as to protrude radially outward in the circumferential direction from the radially outer area of the cage bar 20. The tabs 21 each come into contact with the outer peripheral surface 34 of the roller 4 from a radially outer side. When the cage 5 and the rollers 4 are assembled, the tabs 21 prevent each roller 4 in the pocket 6 from slipping out through the pocket 6 toward a radially outer side of the pocket 6. When the roller bearing 1 is completely assembled, the tabs 21 allow the cage 5 to be radially positioned by the rollers 4.

The cage 5 has bulging portions 22 in a radially inner area of each cage bar 20. The bulging portions 22 each face the outer peripheral surface 34 of the roller 4 with a gap therebetween. The bulging portions 22 are provided on the both sides of each cage bar 20 in the circumferential direction.

The bulging portions 22 are provided so as to protrude from the radially inner area in the circumferential direction. The bulging portions 22 each come into contact with the outer peripheral surface 34 of the roller 4 from a radially inner side. When the cage 5 and the rollers 4 are assembled, the bulging portions 22 prevent each roller 4 in the pocket 6 from slipping out through the pocket 6 toward a radially inner side of the pocket 6. When the roller bearing 1 is completely assembled, the bulging portions 22 allow the cage 5 to be radially positioned by the rollers 4. As described above, the roller bearing 1 of the present embodiment is a roller-guidance cylindrical roller bearing in which the cage 5 is guided by the rollers 4.

Figure 6:
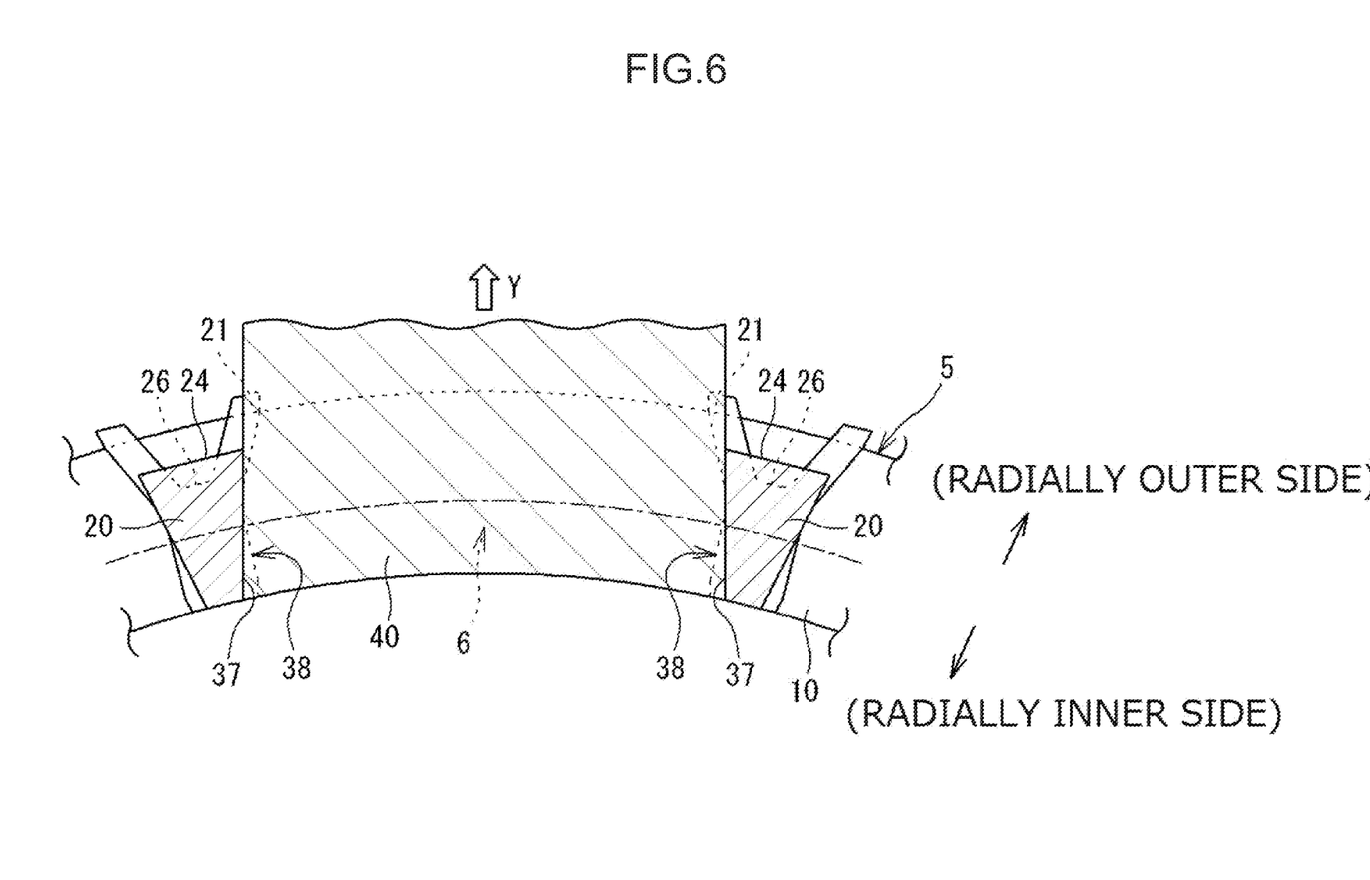
FIG. 6 is a sectional view illustrating a state where the cage is being molded.

To produce the cage 5 molded from a resin, a molten resin is poured into the cavity in the mold and solidified, and then the cage 5, which is a molded product, is demolded. At this time, a part 40 of the mold that penetrates the cage 5 in the radial direction needs to be extracted through the molded pocket 6 toward a radially outer side (in the direction of arrow Y in FIG. 6) as depicted in FIG. 6. In this case, what is called forced extraction needs to be performed in which the part 40 of the mold is extracted while the tabs 21 are being elastically deformed.

In the cage 5 of the present embodiment, the tabs 21 are provided so as to protrude from the cage bars 20. The cage 5 of the present invention has a configuration that limits the elastic deformation to the tabs 21 to the extent possible and that suppresses portions 25 (see FIG. 3) of the cage bar 20, which are located on both sides of the tabs 21 in the longitudinal direction, from being deformed along with the deformation of the tabs 21 when the part 40 (see FIG. 6) of the mold is forcibly extracted. This configuration will be described below.

Figure 7:
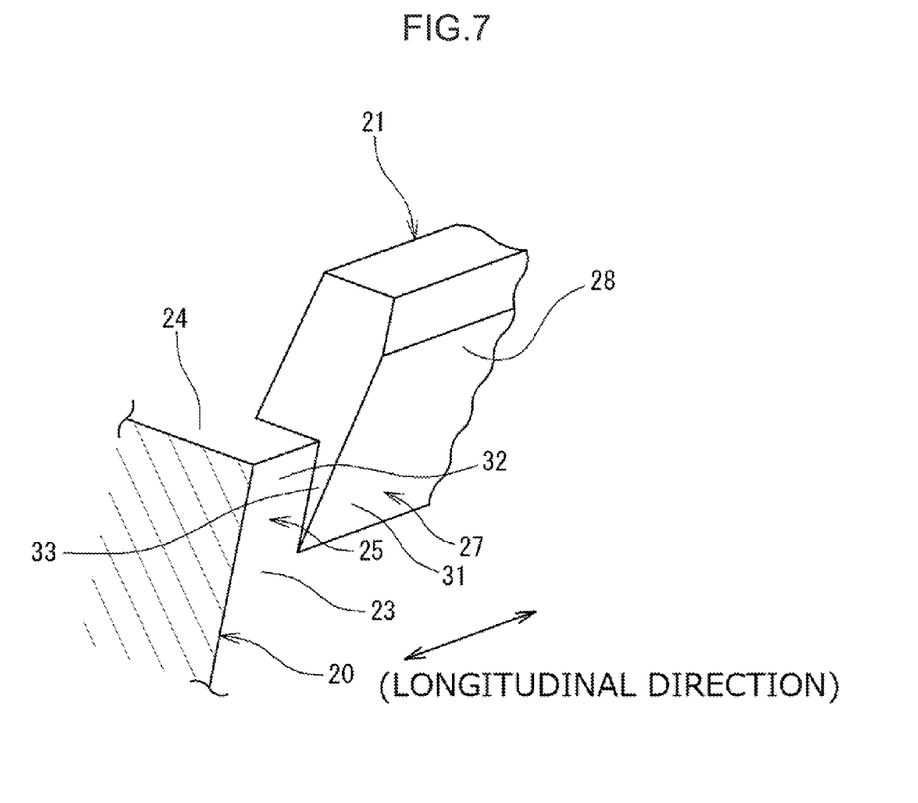
FIG. 7 is a perspective view illustrating the shapes of a tab and a periphery thereof.

FIG. 7 is a perspective view illustrating the shapes of the tab 21 and a periphery thereof. The tab 21 is provided so as to protrude from both an inner surface 23 and a radially outer surface 24 of the cage bar 20. A surface 31 of a bottom portion 27 of the tab 21 is discontinuous with surfaces 32 of the cage bar 20, which are located on the both sides of the tab 21 in the longitudinal direction. In other words, the surface 31 of the bottom portion 27 of the tab 21 and the surfaces 32 of the cage bar 20, which are located on the both sides of the tab 21 in the longitudinal direction, are not formed of one continuous flat surface. A stepped surface 33 facing the longitudinal direction is interposed between the surfaces 31 and 32 to make the surfaces 31 and 32 discontinuous with each other. The stepped surface 33 is orthogonal to the surface 31 and to the surface 32. The surface 31 of the bottom portion 27 of the tab 21 comes into contact with the outer peripheral surface 34 of the roller 4. The surfaces 32 of the cage bar 20, which are located on the both sides of the tab 21 in the longitudinal direction, are parts of a surface (pocket surface) facing the outer peripheral surface 34 of the roller 4 with a gap therebetween.

When the surface 31 of the bottom portion 27 of the tab 21 is discontinuous with the surfaces 32 of the cage bar 20, which are located on the both sides of the tab 21 in the longitudinal direction, as described above, the tab 21 is elastically deformed when the part 40 (see FIG. 6) of the mold is forcibly extracted. However, at this time, the tab 21 is easily deformed at a distal portion 28 (see FIG. 7) and is not easily deformed at the bottom portion 27 of the tab 21 due to the high rigidity of the bottom portion 27. Furthermore, in this configuration, stress is applied in a direction along the radial direction from the distal portion 28 of the tab 21 to the bottom portion 27 of the tab 21. The stress is thus difficult to propagate to the surfaces 32 of the cage bar 20. Consequently, it is possible to suppress local stress in the cage 5.

Figure 8:
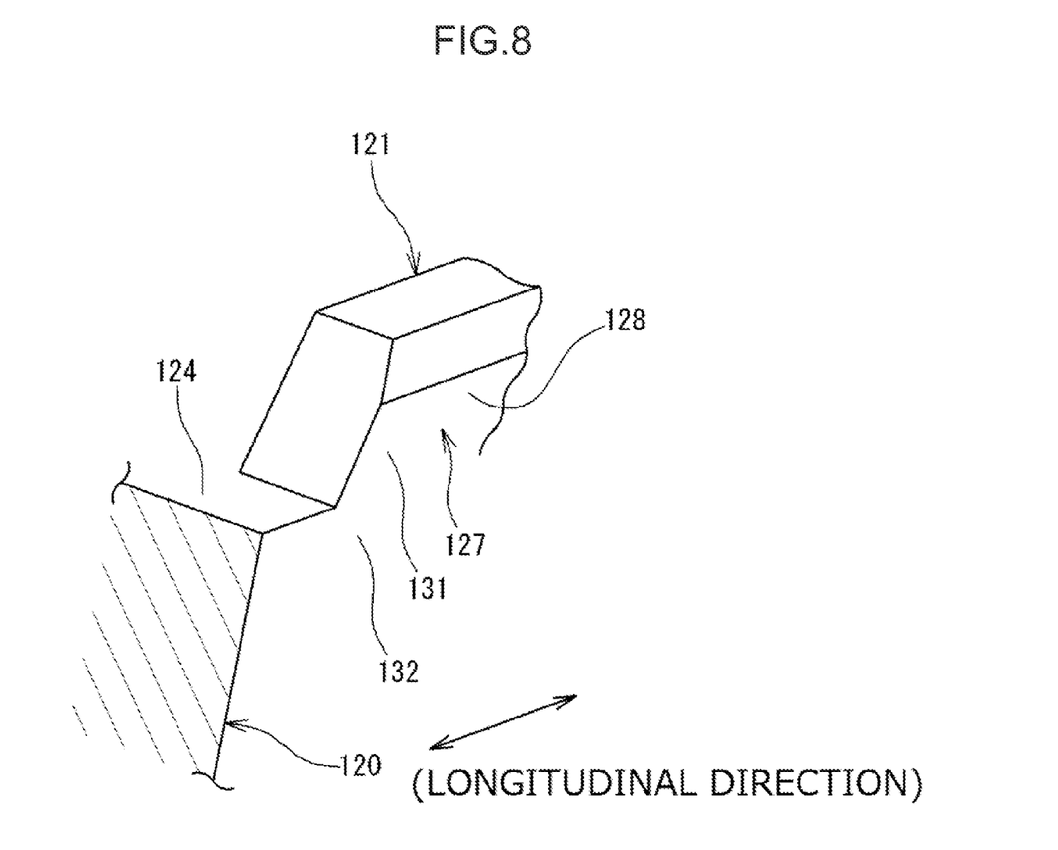
FIG. 8 is a perspective view illustrating the shapes of a conventional tab and a periphery thereof.

A conventional example is depicted in FIG. 8. In a conventional configuration, a bottom portion 127 of a tab 121 protrudes only from a radially outer surface 124 of a cage bar 120, and a surface 131 of the bottom portion 127 of the tab 121 is continuous with a surface 132 of the cage bar 120, as depicted in FIG. 8. In other words, the surface 131 of the bottom portion 127 of the tab 121 and the surface 132 of the cage bar 120 are formed of one continuous flat surface. In this case, at the time of forced extraction, the tab 121 is elastically deformed, but is not only deformed at a distal portion 128 but also easily deformed at the bottom portion 127. The cage bar 120 is significantly deformed (compared to the cage bar 20 in the case in FIG. 7) along with the deformation of the bottom portion 127. In other words, the elastic deformation of the tab 121 causes a part of the cage bar 120 to be pulled by the bottom portion 127 of the tab 21, which results in increased stress. In the conventional example illustrated in FIG. 8, at the time of forced extraction, a large load is applied on the forcibly extracted portion (tab 121) and the periphery thereof (cage bar 120), and for example, local stress is likely to occur in the bottom portion 127. This may result in whitening or damage such as crack or breakage, as described above.

However, in the present embodiment depicted in FIG. 7, the surface 31 of the bottom portion 27 of the tab 21 is discontinuous with the surfaces 32 of the cage bar 20, which are located on the both sides of the tab 21 in the longitudinal direction. Consequently, at the time of forced extraction, the elastic deformation can be limited to the tab 21 to the extent possible to suppress portions 25 (see FIG. 3) of the cage bar 20, which are located on the both sides of the tab 21 in the longitudinal direction, from being deformed along with the deformation of the tab 21. Thus, it is possible to suppress local stress in the cage 5.

In particular, in the present embodiment, the material for the cage 5 is polyphenylene sulfide (PPS), which is a resin material with high chemical resistance, and thus, the cage 5 is more brittle than cages formed of nylon. In this case, it is likely to result in whitening or damage such as crack or breakage when local stress occurs. However, in the configuration of the present embodiment depicted in FIG. 7, local stress is suppressed, and thus whitening or damage can be suppressed. Accordingly, the cage 5 and the roller bearing 1 with the cage 5 can be made more reliable.

Furthermore, in the present embodiment (see FIG. 4), in order that the roller 4 is assembled in each pocket 6 of the cage 5, the roller 4 can be pushed into the pocket 6 from the radially outer side of the cage 5. At this time, the tabs 21 and 21 provided on both sides of the pocket 6 in the circumferential direction are elastically deformed so as to increase the distance (minimum distance B) between the tabs 21 and 21. Even in this case, in the above-described configuration of the cage 5, the portions 25 (see FIG. 3) of the cage bar 20, which are located on the both sides of the tab 21 in the longitudinal direction, can be suppressed from being deformed along with the deformation of the tab 21. Thus, it is possible to suppress local stress in the cage bar 20.

Another configuration will be described that suppresses local stress in the cage 5. As depicted in FIG. 3, the tab 21 is provided over a predetermined length along the longitudinal direction of the cage bar 20, which is parallel to the center line of the cage 5. This length (the longitudinal dimension) is denoted as L1. The bulging portion 22 is also provided over a predetermined length along the longitudinal direction. This length (the longitudinal dimension) is denoted as L2. The tab 21 and the bulging portion 22 are provided in the center of the cage bar 20 in the longitudinal direction and disposed such that the lengths are halved (L1/2 and L2/2) at a center line G. The tab 21 is provided within the bulging portion range of the bulging portion 22 (within the dimension L2). In other words, the longitudinal dimension L1 of the tab 21 provided in the center of the cage bar 20 in the longitudinal direction is set smaller than the longitudinal dimension L2 of the bulging portion 22 provided in the center of the cage bar 20 in the longitudinal direction (L1<L2).

Figure 9:
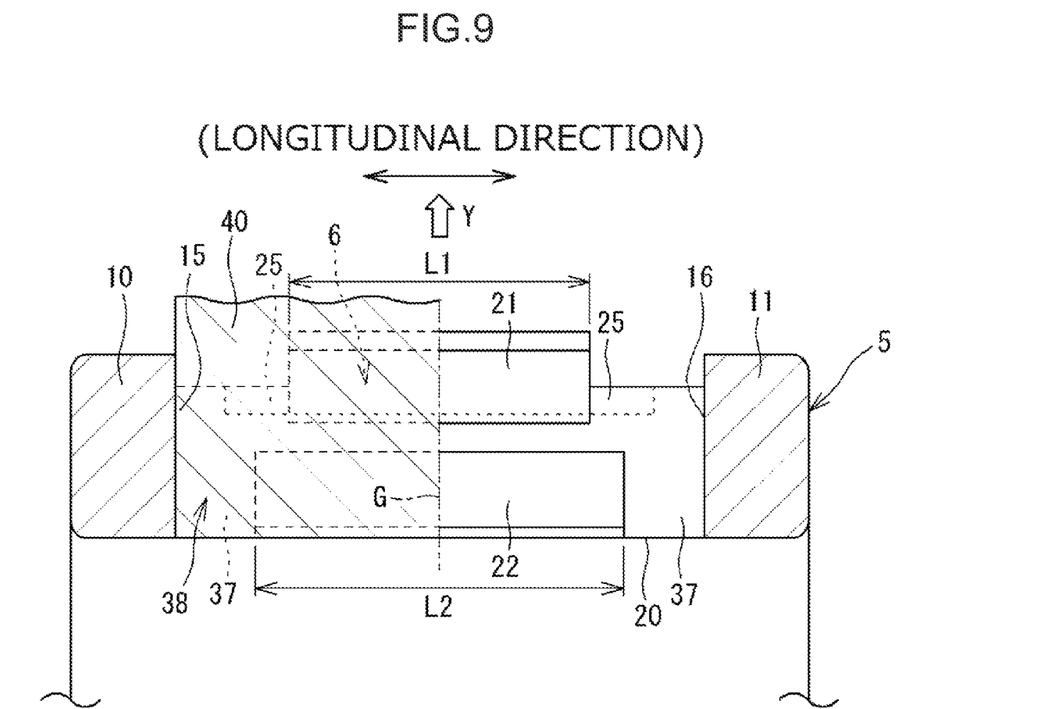
FIG. 9 is a sectional view illustrating a state where the cage is being molded.

As described above, to produce the cage 5 molded from a resin, it is necessary to pour the molten resin into the cavity in the mold, solidify the resin, and extract the part 40 of the mold that penetrates the cage 5 in the radial direction, through the molded pocket 6 toward the radially outer side (in the direction of arrow Y). In the left half of FIG. 9, the part 40 of the mold is depicted in section, whereas, in the right half of FIG. 9, the part 40 of the mold is omitted, with the cage 5 depicted by a continuous line.

In connection with the radially outward extraction of the part 40 of the mold, unlike the embodiment depicted in FIG. 3, it is assumed that the dimension L1 of the tab 21 is set larger than the dimension L2 of the bulging portion 22 (L1>L2); this is not depicted in the drawings. In this case, when mold portions 38 of the part 40 (see FIG. 9) of the mold that form portions 37, which are located on both sides of the bulging portions 22 in the longitudinal direction, are removed from the pocket 6, the mold portions 38 interfere with and push the tab 21, and thus significantly deform the tab 21. As a result, high stress may occur in the tab 21.

In contrast, the dimension L1 of the tab 21 is set smaller than the dimension L2 of the bulging portions 22 (L1<L2) as in the embodiment depicted in FIG. 3. In this case, upon being removed from the pocket 6, the mold portions 38 (see FIG. 9) are prevented from interfering with the tab 21, and thus do not push and significantly deform the tab 21. As a result, it is possible to suppress local stress in the tab 21.

Yet another configuration will be described that suppresses local stress in the cage 5. As described above, the tabs 21 are provided on the both sides of each cage bar 20 in the circumferential direction (see FIG. 4). In the radially outer surface 24 of each cage bar 20, a groove 26 is formed between the tabs 21 and 21 provided on the both sides of the cage bar 20 in the circumferential direction. As depicted in FIG. 3, like the tab 21, the groove 26 is a part of the cage bar 20 and is formed in the center of the cage bar 20 in the longitudinal direction and disposed such that the length of the groove 26 is halved at the center line G. The groove 26 is formed to be longer than the longitudinal dimension L1 of the tab 21.

In this configuration, when the part 40 (see FIG. 6) of the mold is extracted toward the radially outer side, the tab 21 is elastically deformed and a part of the cage bar 20 can be deformed so as to narrow the groove 26. This allows suppressing local stress in the cage bar 20 and the tab 21. Furthermore, also when the roller 4 is assembled into the cage 5 from the radially outer side, the tabs 21 and 21 on the both sides of the pocket 6 in the circumferential direction need to be elastically deformed. Even in this case, the groove 26 allows the tab 21 to be elastically deformed and also enables a part of the cage bar 20 to be deformed so as to narrow the groove 26. Thus, it is possible to suppress local stress in the cage bar 20 and the tab 21.

Furthermore, the roller bearing 1 of the present embodiment is lubricated with a lubricant. Excessive shortage of the lubricant shortens the life of the roller bearing 1. The groove 26 also functions as a recessed portion in which the lubricant is collected. The lubricant collected in the groove 26 is supplied to the raceway surface 9 of the outer ring 3 and the like. Consequently, the groove 26 allows improving the lubrication performance of the roller bearing 1.

Assembly of the cage 5 and the rollers 4 will be described. When each roller 4 is assembled into the pocket 6 of the cage 5 of the present embodiment, the roller 4 may be pushed into the pocket 6 from the radially outer side or from the radially inner side. When the roller 4 is pushed into the pocket 6 from the radially outer side, the tabs 21 provided on the both sides of the pocket 6 in the circumferential direction are elastically deformed such that the distance between the tabs 21 is increased. In contrast, when the roller 4 is pushed into the pocket 6 from the radially inner side, the cage bars 20 and 20 including the bulging portions 22 and 22 provided on the both sides of the pocket 6 in the circumferential direction are elastically deformed such that the distance between the cage bars 20 and 20 is increased.

Figure 10:
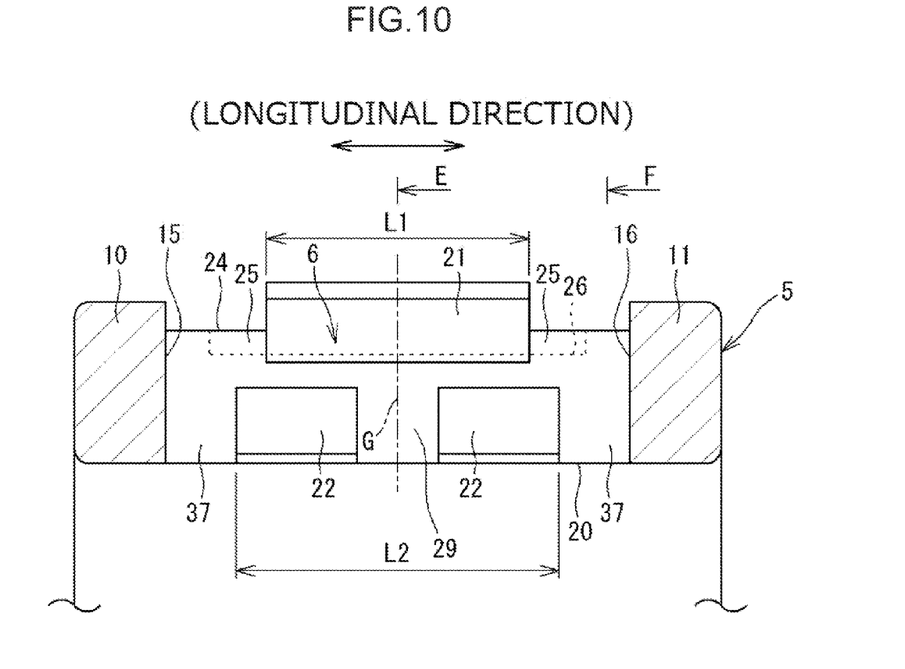
FIG. 10 is a longitudinal sectional view depicting a variation of the cage depicted in FIG. 3.

As depicted in FIG. 10, for the assembly of the cage 5 and rollers 4 by pushing the rollers 4 into the respective pockets 6 from the radially inner side, a plurality of (in FIG. 10, two) bulging portions 22 is preferably provided in juxtaposition along the longitudinal direction and the area between the bulging portions 22 is preferably recessed ally inner side. In other words, the recessed portion 29 is formed between the bulging portions 22. FIG. 10 is a longitudinal sectional view depicting a variation of the cage 5 depicted in FIG. 3.

In this configuration, when the roller 4 is pushed into the pocket 6 from the radially inner side, the cage bar 20 including the bulging portions 22 is easily deformed, allowing the roller 4 to be easily pushed into the pocket 6. Thus, local stress in the cage 5 (cage bar 20) can be suppressed.

The recessed portion 29 also functions as a recessed portion in which the lubricant is collected. The lubricant collected in the recessed portion 29 is supplied to an outer peripheral surface of the roller 4 and the like. Consequently, the recessed portion 29 enables the lubrication performance of the roller bearing 1 to be enhanced.

The shapes of the tab 21 and the bulging portions 22 will further be described. As depicted in FIG. 5, the sectional shape of the cage bar 20 is such that the cage bar 20 is tapered so as to decrease in circumferential dimension toward the radially inner side. A distance E between radially inner ends 20a and 20a of the circumferentially adjacent cage bars 20 and 20 is set larger than the diameter D of the roller 4. A minimum distance A between the bulging portions 22 and 22 of the cage bars 20 and 20 is set smaller than the diameter D. Consequently, each roller 4 and the cage 5 can be aligned with each other (the roller 4 and the cage 5 can be held in position).

As depicted in FIG. 4, each bulging portion 22 has a flat surface 22b extending linearly from a radially central portion of the cage bar 20 and coming into contact with the outer peripheral surface 34 of the roller 4. The flat surface 22b provided on the bulging portion 22 allows the part 40 (see FIG. 6) of the mold to be easily removed through the pocket 6 at the time of demolding.

A minimum distance C (see FIG. 4 and FIG. 5) between radially outer portions of the circumferentially adjacent cage bars 20 and 20 is set smaller than the diameter D of the roller 4. A minimum distance B between the tabs 21 and 21 of the cage bars 20 and 20 is set smaller than the diameter D of the roller 4. The minimum distance C between the cage bars 20 and 20 is set larger than the minimum distance B between the tabs 21 and 21.

Each tab 21 has a flat surface 21b (see FIG. 4) extending linearly from the radially central portion of the cage bar 20 and coming into contact with the outer peripheral surface 34 of the roller 4. The flat surface 21b provided on the tab 21 allows the part 40 (see FIG. 6) of the mold to be easily removed through the pocket 6 at the time of demolding.

An inner surface 15 of the annular ring 10 defining the pocket 6 has contact surface portions 17 with which an axial end surface of the roller 4 is in contact. Each contact surface portion 17 is a surface slightly bulging from the inner surface 15. The roller 4 is in contact with the inner surface 15 only at the contact surface portions 17 rather than over a wide range. In the present embodiment, the two contact surface portions 17 are provided such that the center of the pocket 6 is between the contact surface portions 17. Similar contact surface portions 17 are formed in an inner surface 16 of the other annular ring 11.

The roller bearing 1 of the present invention is not limited to the illustrated form but may be in any other form within the scope of the present invention. In the above-described embodiment, the case has been described where the tabs 21 and the bulging portions 22 are provided which can come into contact with the rollers 4 from the radially inner side and from the radially outer side so that the cage 5 can be used in different cases. However, the bulging portions 22 may be omitted from the cage 5. Furthermore, in the above-described embodiment, the roller bearing 1 is described as a cylindrical roller bearing. However, the roller bearing 1 may be a needle roller bearing. The case has been described where the inner ring 2 has the ribs 7. However, the ribs may be omitted.

In the roller bearing of the present invention, when the cage is produced, elastic deformation can be limited to the tabs to the extent possible and the portions of each cage bar, which are located on the both sides of the tab in the longitudinal direction, can be suppressed from being deformed along with the deformation of the tab. As a result, local stress in the cage can be suppressed.

What is claimed is:
1. A roller bearing comprising:
an inner ring;
an outer ring;
a plurality of rollers provided between the inner ring and the outer ring; and
a cage made of resin and holding the rollers at intervals along a circumferential direction of the cage, wherein
the cage includes a pair of annular rings and a plurality of cage bars that are disposed such that a longitudinal direction of each cage bar is parallel to a center line of the cage and that couples the annular rings together, and an area enclosed by the pair of annular rings and circumferentially adjacent cage bars serves as a pocket configured to hold each roller,
each respective cage bar defining a radially outward surface, and configured with a pair of tabs provided so as to protrude radially outward from the radially outward surface of each respective cage bar, the pair of tabs configured to prevent the roller in the pocket from slipping out through the pocket toward a radially outer side,
a surface of a bottom portion of each tab is discontinuous with surfaces of the cage bar, which are located on both sides of the tab in the longitudinal direction,
in the radially outward surface of each respective cage bar, the pair of tabs are provided on both sides of each respective cage bar in the circumferential direction of the cage,
each cage bar configured with a groove formed between two the tabs such that a bottom surface of the groove is radially inward from the radially outward surface of each respective cage bar the groove extending in the longitudinal direction and being formed in a center of the cage bar such that a length of the groove in the longitudinal direction is halved at the center line.

2. The roller bearing according to claim 1, wherein
the cage further includes a bulging portion protruding from a radially inner area of the cage bar to prevent the roller in the pocket from slipping out toward a radially inner side, and
a longitudinal dimension of the tab is set smaller than a longitudinal dimension of the bulging portion.

3. The roller bearing according to claim 1, wherein
the cage further includes a bulging portion protruding from a radially inner area of the cage bar to prevent the roller in the pocket from slipping out toward a radially inner side, and
a plurality of the bulging portion is provided in juxtaposition along the longitudinal direction.

4. A roller bearing comprising:
an inner ring;
an outer ring;
a plurality of rollers provided between the inner ring and the outer ring; and
a cage made of resin and holding the rollers at intervals along a circumferential direction of the cage, wherein
the cage includes a pair of annular rings and a plurality of cage bars that are disposed such that a longitudinal direction of each cage bar is parallel to a center line of the cage and that couples the annular rings together, and an area enclosed by the pair of annular rings and circumferentially adjacent cage bars serves as a pocket configured to hold each roller,
each respective cage bar defining a radially outward surface, and configured with a pair of tabs provided so as to protrude radially outward from the radially outward surface of each respective cage bar, the pair of tabs configured to prevent the roller in the pocket from slipping out through the pocket toward a radially outer side,
a surface of a bottom portion of each tab is discontinuous with surfaces of the cage bar, which are located on both sides of the tab in the longitudinal direction,
the each respective cage bar further includes a bulging portion protruding from a radially inner area of the cage bar to prevent the roller in the pocket from slipping out toward a radially inner side,
a longitudinal dimension of the tab is set smaller than a longitudinal dimension of the bulging portion,
a plurality of the bulging portion is provided in juxtaposition along the longitudinal direction.

5. A roller bearing comprising:
an inner ring;
an outer ring;
a plurality of rollers provided between the inner ring and the outer ring; and
a cage made of resin and holding the rollers at intervals along a circumferential direction of the cage, wherein
the cage includes a pair of annular rings and a plurality of cage bars that are disposed such that a longitudinal direction of each cage bar is parallel to a center line of the cage and that couples the annular rings together, and an area enclosed by the pair of annular rings and circumferentially adjacent cage bars serves as a pocket configured to hold each roller,
each respective cage bar defining a radially outward surface, and configured with a pair of tabs provided so as to protrude radially outward from the radially outward surface of each respective cage bar, the pair of tabs configured to prevent the roller in the pocket from slipping out through the pocket toward a radially outer side,
a surface of a bottom portion of each tab is discontinuous with surfaces of the cage bar, which are located on both sides of the tab in the longitudinal direction,
each cage bar further includes a bulging portion protruding from a radially inner area of each respective cage bar to prevent the roller in the pocket from slipping out toward a radially inner side,
a longitudinal dimension of each tab is set smaller than a longitudinal dimension of each respective bulging portion,
the pair of tabs are provided on both sides of each respective cage bar in the circumferential direction of the cage, and a groove is formed between each respective pair of tabs, such that a bottom surface of the groove is radially inward from the radially outward surface of each respective cage bar, and
a plurality of the bulging portion is provided in juxtaposition along the longitudinal direction.

* * * * *